(12) United States Patent
May

(10) Patent No.: US 6,348,772 B1
(45) Date of Patent: Feb. 19, 2002

(54) CONTROL DEVICE

(75) Inventor: Norbert May, Babenhausen (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/461,547

(22) Filed: Dec. 14, 1999

(30) Foreign Application Priority Data

Dec. 15, 1998 (DE) .......................................... 198 57 837

(51) Int. Cl.[7] ................................................ H02P 1/04
(52) U.S. Cl. ........................... 318/430; 200/4; 200/314; 200/316; 200/336; 200/341
(58) Field of Search ................................. 318/430, 446, 318/466, 489, 552; 200/4, 52 R, 521, 564, 310, 313, 314, 316, 336, 341; 250/465.1; 362/394; 187/395

(56) References Cited

U.S. PATENT DOCUMENTS

| | | | | |
|---|---|---|---|---|
| 4,430,540 A | * | 2/1984 | Scalf ................... | 219/10.55 B |
| 4,546,298 A | * | 10/1985 | Wickham et al. ........... | 318/372 |
| 5,039,832 A | * | 8/1991 | Polacek et al. ............. | 200/317 |
| 5,310,974 A | * | 5/1994 | Churchill et al. ........... | 200/566 |
| 5,373,132 A | * | 12/1994 | Achermann et al. ........ | 200/310 |
| 5,379,865 A | * | 1/1995 | Berdich et al. ............. | 187/398 |
| 5,679,933 A | * | 10/1997 | Weber et al. ............... | 187/395 |
| 5,711,415 A | * | 1/1998 | Fukuda et al. .............. | 200/570 |
| 5,726,649 A | * | 3/1998 | Tamaru et al. ................ | 341/35 |
| 6,003,367 A | * | 12/1999 | Bux et al. ...................... | 73/462 |
| 6,100,476 A | * | 8/2000 | Adamietz et al. .............. | 200/4 |

FOREIGN PATENT DOCUMENTS

| | | |
|---|---|---|
| DE | 3909565 | 10/1990 |
| DE | 8913910 | 12/1990 |
| DE | 29606501 | 7/1996 |
| DE | 19610700 | 9/1997 |
| DE | 19651315 | 6/1998 |

* cited by examiner

*Primary Examiner*—Robert E. Nappi
*Assistant Examiner*—Edgardo San Martin
(74) *Attorney, Agent, or Firm*—Martin A. Farber

(57) ABSTRACT

In a control device (1) having an actuator (2) which can be activated manually, an arresting element (8) is used to provide haptic feedback for a rotating sensation which is associated with the selected function. This rotating sensation, for example individual latching steps, is represented visually by means of display (9) which is arranged on a rotary actuating element (3) of the actuator (2). As a result, the user is quickly provided with an overview of the avaliable, position of the actuator (2) which it is possible to set.

12 Claims, 2 Drawing Sheets

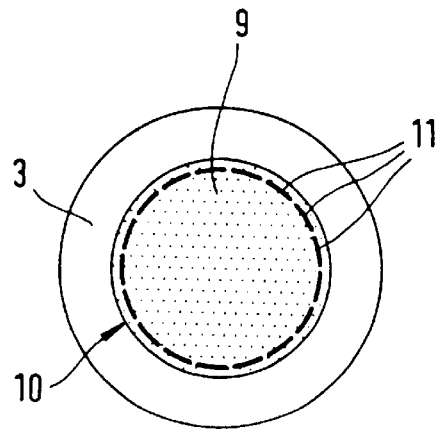
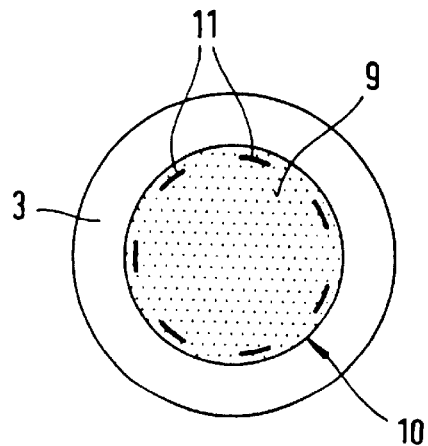
Fig. 3       Fig. 4
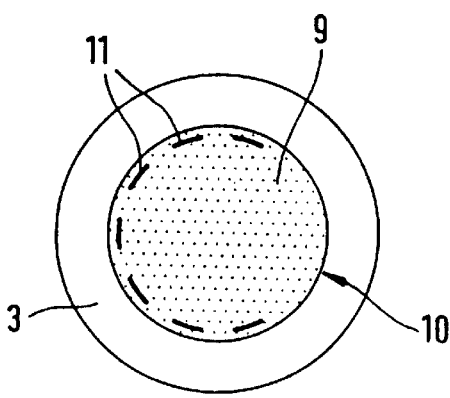
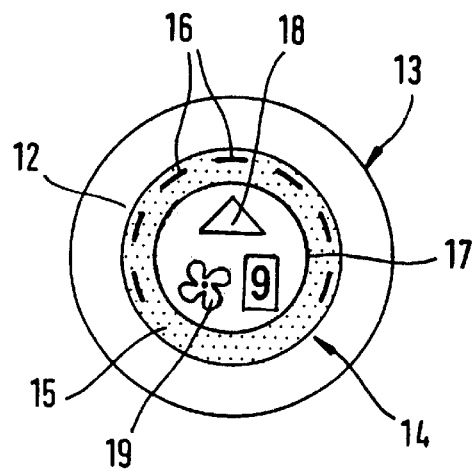
Fig. 5       Fig. 6

CONTROL DEVICE

SUMMARY OF THE INVENTION

FIELD AND BACKGROUND OF THE INVENTION

The invention relates to a control device, in particular for a motor vehicle, having an actuator which can be activated manually, and having an arresting element which is designed to exert a force on the actuator as a function of control signals.

Such control devices are often used to input data into electronic devices and are thus known. In order to activate the device, the user firstly selects a desired function, for example by activating the actuator by applying pressure. Then, the controlled variable of the selected function is set by means of a rotary activation of the actuator. The force which is necessary for the rotary activation is variable depending on the function selected, and is generated using the arresting element. For this purpose, the arresting element has an electric motor which exerts the arresting force on the actuator and thus permits the user of the control device to be provided with so-called haptic feedback. The force is dependent on the functional level selected and the associated rotary torque characteristic curves which are stored in a memory and can be freely programmed for this purpose.

Thus, it is possible, for example, to program a countertorque which is proportional to the rotational speed, for example for setting frequencies or dimming, to program latching steps, for example for volume control, to program haptic marks in order to indicate specific positions of the actuator, for example for air conditioning, or even to program an increasing countertorque in order to indicate minimum and maximum positions. The electric motor which is used as an arresting element is even capable of accelerating the activation element in the direction of the activation force so that the activation element merely has to be pressed with the finger at an appropriate programming of the memory in order to perform a control operation, or can signal, by vibrating, that a limiting value has been exceeded. As a result, a single control device can be used for a variety of application areas. Therefore, the control device is preferably used for setting the various types of equipment and devices, such as navigation systems and air conditioning systems, which are found in a motor vehicle.

In control devices which are designed in this way it is disadvantageous that the force which is exerted by the arresting element, i.e. the rotating sensation which has been set for the user, cannot be perceived directly. To perceive the sensation, the user must firstly activate the actuator and "feel out" the rotating sensation which has been set, for example the number of latching steps. Of course, consideration has already been given to the possibility of defining the value of the set function in its basic setting to an average value which can then be corrected upwardly or downwardly on an individual basis by the user, but this arrangement does not permit any conclusions to be drawn concerning the range or graduation of the values which can be set.

Furthermore, it is also known to represent the set function and the set value graphically in a display. In such a case, a minimum value which can be set or a maximum value which can be set is usually apparent but it is not possible to draw conclusions concerning the actuator which is to be activated. Furthermore, the display is often arranged at a central location and connected to a plurality of control devices, the assignment of said control devices being frequently felt to be very complicated.

The invention is based on the problem of providing a control device of the type mentioned at the beginning in such a way that control is made easier, in particular the intention here is that the selection possibilities should be readily apparent without firstly having to set all the possible values on a trial basis in order to detect them.

This problem is solved according to the invention by means of a display for representing information as a function of the control signals for exerting the force on the actuator. As a result, a visual display which is directly apparent to the user can be provided directly as a function of the force which acts on the actuator by way of the arresting element, and thus as a function of the rotating sensation which can be perceived by the user. In particular, the number of possible latching steps or the range between a minimum value and a maximum value can be represented for this purpose. Therefore, the user does not need to determine the range of the possible settings by trying them out, but instead can relate the value which has been set directly to the range of the possible values.

The display can have an alphanumeric or symbolic representation of the rotating sensation which is imparted by means of the arresting element. However, an embodiment of the invention in which the display has a row of illuminable elements with sections which can be driven individually is particularly advantageous. The row of illuminable elements can be used to represent, firstly, the minimum and maximum position, and secondly also latching steps, by means of an appropriate number of driven sections or an infinitely variable setting using a row of illuminable elements which can be driven continuously. As a result, the relationship between the display and the rotating sensation is directly apparent to the user, and therefore requires no further indications.

In this context it is also particularly favorable if the display has a plurality of LEDs. This makes it possible to provide a display which can be read reliably and without difficulty and which is also easy to manufacture and available in different shapes and illuminated colors. Furthermore, it is possible to use a single LED to set different illuminated colors depending on the way in which it is driven, and thus to highlight certain values visually, for example, One embodiment of the invention is particularly advantageous by virtue of the fact that the display is arranged on the actuator. The association between the actuator and the force which is applied by means of the arresting element is thus readily apparent. At the same time, the actuator and the display can be manufactured as one structural unit, thus making it easier to install.

One development of the invention can be used particularly easily by virtue of the fact that the actuator has a rotary actuating element. A rotary actuating element can be activated comparatively sensitively and precisely. At the same time, its permissible rotational angle can be adapted in an optimum way to the respective set function by means of the arresting element; for example a small number of latching steps only require a small rotational angle in contrast to a proportional setting, which is easier to use the greater the maximum rotational angle selected. When this is the case, the display also makes it possible to visualize the angular position of the possible range of rotational angles.

In this context, an embodiment of the invention in which the display is positioned on the circumference of the rotary actuating element is also particularly simple. As a result of this, a compact embodiment is obtained, which can also be provided as one structural unit. The display can thus be arranged either in such a way that it rotates together with the rotary actuating element or is fixed, and it can, for example, be covered by a transparent region of the rotary actuating element. The rotational embodiment of the display makes it possible not only to represent the force applied by the arresting element but also to read the set value by means of the rotational angle of the display against a fixed background.

Another advantageous development of the invention is also provided by arranging the display on an end face of the actuator. As a result, the display can be read without difficulty and arranged, for example, in this case in a central recess or underneath an essentially transparent section of the actuator, in which case the display can be designed in such a way that it rotates with the actuator or is fixed. The display can be arranged in a space-saving manner on the end face and can thus also be read during the activation process.

A particularly versatile embodiment of the invention is provided if the display is at the same time providing to represent the position of the actuator. In addition to a representation of all the possible positions of the actuator, such as in particular the number of latching steps or the maximum value, it is also possible to read the value which has been set at a given moment. This can be achieved, for example, by visually highlighting the current value, for example by changing the color of the corresponding LED. The integrated representation of both types of information enables reading errors to be largely ruled out and further simplifies the manufacturing process.

A particularly practical development of the invention is obtained if the control device has a display for representing a selected function. As a result, it is possible to dispense with further means for representing the selected function. In particular if a plurality of control devices are used, the user does not need to decide initially which control device is assigned to the respective function but instead can discern this directly from the display. As a result, the control device is simultaneously a structural unit and a functional unit which can be operated easily without additional means.

For this purpose, the display could permit symbols, for example pictograms, to be represented. But on the other hand, a development of the invention in which the display has an LCD is particularly versatile. As a result, the control device can be adapted to any desired purposes of use. The desired information can be entered here individually so that virtually any desired number of different functions can be activated with a single control device. At the same time, this will permit both later installation of further functions and adaptation to the changing state of the art to be performed without difficulty, possibly even by the end user.

BRIEF DESCRIPTION OF THE DRAWINGS

The invention permits various embodiments. In order to clarity its basic principle further, two of them are represented in the drawings and are described below. In said drawings FIG. 3 shows a plan view of the rotary actuating element, FIG. 4 shows a plan view of the rotary actuating element on which a different function has been set, FIG. 5 shows a plan view of the rotary actuating element on which a further function has been set, and FIG. 6 shows a plan view of a rotary actuating element of a further actuator with an additional display.

DETAILED DESCRIPTION OF THE PREFERRED EMBODIMENT

Figure 1:
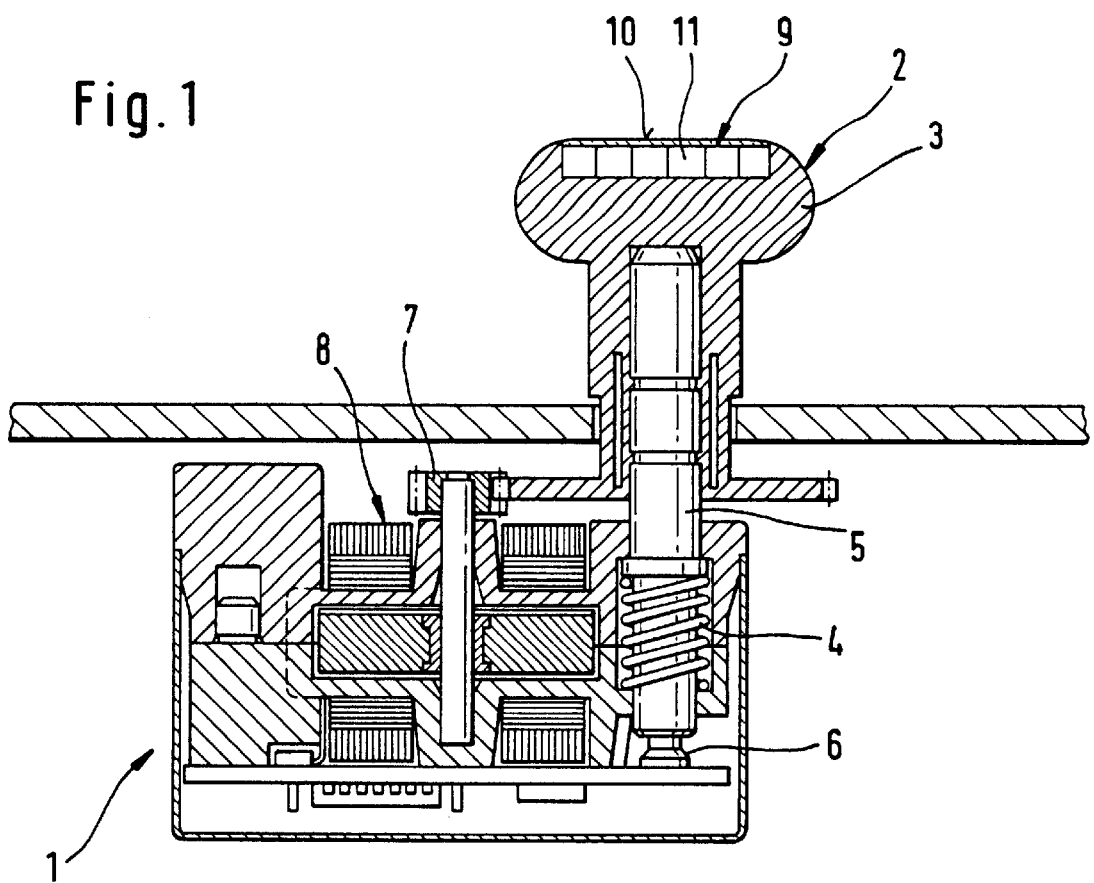
FIG. 1 shows a sectional front view of a control device according to the invention.

FIG. 1 shows a sectional representation of a control device 1 according to the invention, having an actuator 2 which has a rotary actuating element 3. The actuator 2 has a shaft 5 which can be activated counter to the spring force of a spring element 4 by applying pressure and which acts on a push-button key 6. By pressing the actuator 2 repeatedly, the desired function can be selected, and the desired value can be set by means of rotary activation of the actuator 2. An arresting element 8 acts on the actuator 2 by means of a toothed wheel 7, and, depending on the selected function, imparts to the user of the control device 1 an appropriate and individually definable rotating sensation. In particular, the rotating sensation of fine latching steps, haptic marks, minimum and maximum positions etc. can be imparted. This rotating sensation which is generated by the arresting element 8 is represented visually by means of a display 9 on an end face 10 on the upper aide of the rotary actuating element 3 of the actuator 2. For this purpose, the display 9 has a plurality of LEDs 11 which can be driven individually by means of a control unit (not illustrated) and which can be driven, for example, as a function of the number and position of the latching steps. The display 9 is arranged here underneath the essentially transparent end face 10 of the rotary actuating element 3, and thus protected against damage and environmental influences.

Figure 2:
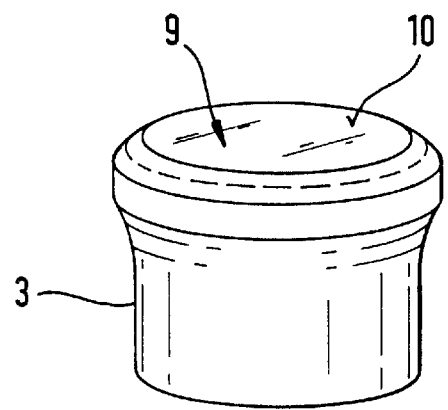
FIG. 2 shows a perspective representation of a rotary actuating element of the control device.

The rotary actuating element 3 is shown in FIG. 2 in a perspective view. The essentially transparent embodiment of the end face 10 of the rotary actuating element 3 is apparent. Arranged underneath the end face 10 is the circular display 9 which, by virtue of its central arrangement, the user can still read even during the activation process.

FIG. 3 shows a plan view of the rotary actuating element 3 having the display 9 which is arranged underneath the transparent end face 10. The LEDs 11 which are arranged in a circular shape are driven without exception in the functional state illustrated so that the user perceives the display 9 as a bright circle, and the set rotating sensation of a proportional, step-free rotary torque with a 360° rotational angle is thus presented to him visually.

Another rotating sensation which can be represented by the display 9 is shown in FIG. 4. Here, seven LEDs 11 which are distributed uniformly over the circumference of the end face 10 of the rotary actuating element 3 are driven individually, and in this way present to the user visually a rotating sensation which corresponds to seven latching steps.

A similar way of driving the rotary actuating element 3 is shown by the display 9 in FIG. 5. Here, seven individual LEDs 11 are also driven. In contrast to the functional mode shown in FIG. 4, the latching steps are not distributed uniformly over the circumference here but rather essentially on the left hand half of the end face 10. This is advantageous if the spatial position of the latching steps permits the user to make a logical association with the selected function. For example, it is thus possible to activate a headlight height adjuster, the upper LED 11 also corresponding at the same time to the highest position of a headlight.

A plan view of a rotary actuating element 12 of a further actuator 13 is shown by FIG. 6, Here, a display 15 is arranged on an end face 14 of the rotary actuating element 12 and, in addition to a plurality of LEDs 16, it also has a centrally arranged LCD 17. In the functional mode shown, the seven latching steps which are available are firstly represented by means of the LEDs 16. The LCD 17 additionally shows, by means of a pointer 18, the currently set value of the selected function which is represented in the form of a symbol 19. In the present case, the fourth latching step of the ventilation function has been selected, the current outside temperature, for example, being additionally displayed by means of the numeral "9". In this embodiment, the control device which is not illustrated in more detail can be used in a versatile way as an integrated functional unit without an additional display.

I claim:

1. A control device, in particular for a motor vehicle, comprising an actuator which is activatable manually, and an arresting element exerting a force on the actuator as a function of input control signals, the control device being defined by a display (9, 15) for representing information as a function of the input control signals for exerting the force on the actuator (2, 13), wherein the display (9, 15) has a row of illuminable elements with sections which are drivable individually, wherein the actuator (2, 13) has a rotary actuating element (3, 12), wherein the display (9, 15) is positioned on a circumference of the rotary actuating element (3, 12).

2. The control device as claimed in claim 1, wherein the display (9, 15) has a plurality of LEDs (11, 16).

3. The control device as claimed in claim 1, wherein the display (9, 15) is arranged on the actuator (2, 13).

4. The control device as claimed in claim 1, wherein the display (9, 15) is arranged on an end face (10, 14) of the actuator.

5. The control device as claimed in claim 1, wherein the display (9, 15) at the same time represents position of the actuator (2, 13).

6. The control device as claimed in claim 1, wherein the display (9, 15) is for representing a selected function.

7. The control device as claimed in claim 1, wherein the display (9, 15) has an LCD (17).

8. A control device for a motor vehicle, comprising a rotatable actuator which is activatable manually, an arresting element exerting a force on the rotatable actuator as a function of input control signals, a display (9, 15) for representing information as a function of the input control signals for exerting the force on the rotatable actuator (2, 13), wherein the control device inputs data into electronic devices, different functions being selectable from at least one of said electronic devices, wherein the display (9, 15) is arranged on the rotatable actuator, wherein the display (9, 15) representing a selected function of the electronic devices, wherein the display (9, 15) is arranged on an end face (10, 14) of the rotatable actuator and said display rotates together with the rotatable actuator, wherein the control device has reading means for reading a display rotation angle which is a function of the input control signals.

9. The control device as claimed in claim 8, wherein the display (9, 15) is positioned on a circumference of the rotary actuating element (3, 12).

10. The control device as claimed in claim 9, wherein the display (9, 15) represents position of the actuator (2, 13).

11. The control device as claimed in claim 8, wherein the control device (1) has a display (9, 15) for representing a selected function.

12. The control device as claimed in claim 11, wherein the display (9, 15) has an LCD (17).

* * * * *